United States Patent
Apel et al.

(10) Patent No.: US 11,968,074 B2
(45) Date of Patent: Apr. 23, 2024

(54) METHOD FOR OPERATING A CONTROL ARRANGEMENT FOR AN ENERGY NETWORK, AND CONTROL ARRANGEMENT

(71) Applicant: Siemens Aktiengesellschaft, Munich (DE)

(72) Inventors: Rolf Apel, Nuremberg (DE); Torsten Dauss, Nuremberg (DE)

(73) Assignee: Siemens Aktiengesellschaft, Munich (DE)

( * ) Notice: Subject to any disclaimer, the term of this patent is extended or adjusted under 35 U.S.C. 154(b) by 30 days.

(21) Appl. No.: 17/953,531

(22) Filed: Sep. 27, 2022

(65) Prior Publication Data

US 2023/0094465 A1 Mar. 30, 2023

(30) Foreign Application Priority Data

Sep. 27, 2021 (EP) .................................... 21199159

(51) Int. Cl.
*H04L 41/046* (2022.01)
*G06F 8/61* (2018.01)
*H04L 9/32* (2006.01)

(52) U.S. Cl.
CPC .............. *H04L 41/046* (2013.01); *G06F 8/61* (2013.01); *H04L 9/3263* (2013.01)

(58) Field of Classification Search
CPC ........ H04L 41/046; H04L 9/3263; G06F 8/61
See application file for complete search history.

(56) References Cited

U.S. PATENT DOCUMENTS

| 10,990,068 | B2 * | 4/2021 | Val | H04W 12/03 |
|---|---|---|---|---|
| 2015/0067819 | A1 * | 3/2015 | Shribman | H04L 67/141 709/218 |
| 2015/0163288 | A1 | 6/2015 | Maes et al. | |
| 2016/0202744 | A1 * | 7/2016 | Castro-Leon | G06F 9/5094 713/310 |
| 2017/0005515 | A1 * | 1/2017 | Sanders | H02J 3/388 |
| 2019/0234786 | A1 * | 8/2019 | Klicpera | G01M 3/26 |
| 2020/0348641 | A1 * | 11/2020 | Li | G06N 20/00 |
| 2021/0342836 | A1 * | 11/2021 | Cella | H04L 9/3239 |

OTHER PUBLICATIONS

Anderson David et al: "GridCloud: Infrastructure for Cloud-Based Wide Area Monitoring of Bulk Electric Power Grids", IEEE Transactions On Smart Grid, IEEE, USA, vol. 10, No. 2, Mar. 1, 2019 (Mar. 1, 2019), pp. 2170-2179, XP011710442, ISSN: 1949-3053, DOI: 10.1109/TSG.2018.2791021 [retrieved Feb. 16, 2019].
Yigit Melike et al: "Cloud Computing for Smart Grid applications", Computer Networks, Elsevier, Amsterdam, NL, vol. 70, Jun. 20, 2014 (Jun. 20, 2014), pp. 312-329, XP029010100, ISSN: 1389-1286, DOI: 10.1016/J.COMNET.2014.06.007.

\* cited by examiner

*Primary Examiner* — Minh Chau Nguyen
(74) *Attorney, Agent, or Firm* — Laurence A. Greenberg; Werner H. Stemer; Ralph E. Locher

(57) ABSTRACT

A method for operating a control arrangement for an energy network. The control arrangement has a cloud infrastructure with data processor resources and data storage resources. A first group of software modules is executed on the cloud infrastructure, and a second group of software modules is locally executed on a server computer arrangement. The first group and the second group are connected for data communication via interfaces. The interfaces utilize a public key infrastructure (PKI) for encryption.

15 Claims, 1 Drawing Sheet

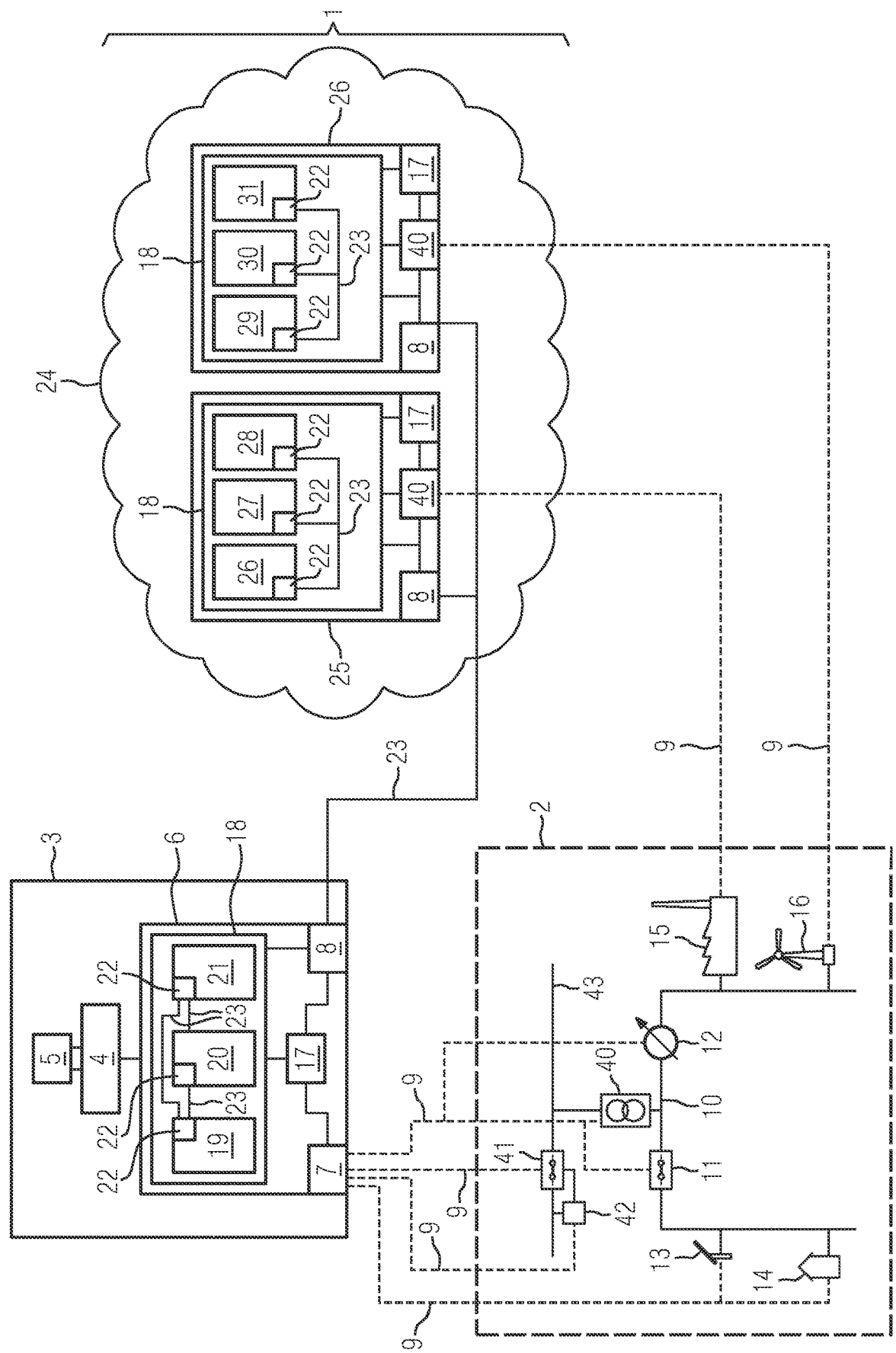

METHOD FOR OPERATING A CONTROL ARRANGEMENT FOR AN ENERGY NETWORK, AND CONTROL ARRANGEMENT

CROSS-REFERENCE TO RELATED APPLICATION

This application claims the priority, under 35 U.S.C. § 119, of European Patent Application EP21199159.1, filed Sep. 27, 2021; the prior application is herewith incorporated by reference in its entirety.

FIELD AND BACKGROUND OF THE INVENTION

The invention relates to a method for operating a control arrangement for an energy network. The invention also relates to a control arrangement for an energy network with a cloud infrastructure having data processor resources and data storage resources, and a first group of software modules for execution on the cloud infrastructure.

Energy networks for electrical energy, gas networks or water distribution networks must be managed by a network control system, usually arranged in a network control center. On account of the increasing use of renewable energies, for example wind power installations or photovoltaic installations, electrical energy networks must constantly be able to be maintained or expanded in a more flexible and simpler manner. In addition, the so-called sector coupling requires more and more interfaces between the energy networks for heat and gas, for example, which have hitherto often been managed separately.

A first generation of network control system software for the network control center was developed in the 1970s. It used server computers which were specifically configured for this application and were installed in situ in the computer room of the control center of the network operator. In that case, the server computers typically had a redundant design in order to ensure an availability of the network control system functionality of more than 99.999% of the time. Nowadays, the redundant server computers are sometimes also installed at different locations in order to make the entire system even more resistant and, for example in the case of catastrophic events such as earthquakes or fire at one location, to still ensure a control center functionality at the other location by means of the server computers.

In the meantime, a cloud software architecture has been introduced for many software applications. In the sense of the invention, this involves possibly spatially distributed data processor and data storage devices which are connected by way of a data communication network, for example the Internet. In this case, software can be executed as a so-called cloud application in a modular manner wherever sufficient data processor and/or data storage resources are currently available. This ensures a high degree of scalability and availability. In addition, the need to operate and maintain separate server computers or hardware on a large scale and to protect them against hacker attacks is substantially dispensed with for many companies. In addition, network control systems must be dimensioned in such a manner that they can process extremely large volumes of data, as arise in the event of faults in the energy network for example, without a loss of data. This means that the computing resources are only partially utilized during normal operation, which is both economically and ecologically inefficient.

U.S. Pat. No. 10,990,068 B2 discloses an approach for executing existing control center software in a cloud, wherein a so-called "lift and shift" approach is followed. This means that a copy of the executable software and the required databases are loaded into a cloud belonging to a third-party provider with only minimal or even no adaptations. For example, the copy of the software can be used on a so-called "virtual machine," that is to say on a computer which is simulated virtually as encapsulated software within a real or physical computer system. The "virtual machine" can be connected to the work computers and display panels for the engineers in the control center room of the network operator by way of a so-called "virtual private network" (VPN), for example.

SUMMARY OF THE INVENTION

It is accordingly an object of the invention to provide a method and control arrangement which overcomes a variety of shortcomings and disadvantages of the heretofore-known methods and devices of this type and which provides for an improved method of operating a control arrangement for an energy network which achieves comparatively even greater availability, a high degree of security with respect to manipulations, and efficient use of data processing resources.

With the above and other objects in view there is provided, in accordance with the invention, a method of operating a control arrangement for an energy network, the method comprising:
 providing a cloud infrastructure having data processor resources and data storage resources;
 providing a first group of software modules for execution on the cloud infrastructure;
 providing a second group of software modules for local execution on a server computer arrangement; and
 connecting the first group of software modules and the second group of software modules for data communication via interfaces, and using a public key infrastructure for encryption by the interfaces.

In the sense of the invention, a control arrangement for an energy network is a network of computers which are connected by way of data communication and run control center software which is used to receive and further process measurement data and switching states of the energy network and to transmit control commands derived therefrom for controllable equipment such as switchgear, tap changers of transformers, network controllers, controllable electrical energy consumers, controllable producers of electrical energy, capacitor banks, etc. The energy network is monitored and controlled in this manner in order to keep the network voltage and the network frequency in the permitted limits, for example.

An energy network is, for example, an electrical energy supply network of the low-voltage level having a nominal voltage of less than 1 kV. The energy supply network of the low-voltage level is connected, for example via a transformer, to a medium-voltage network which has a nominal voltage of between 1 kV and 52 kV and is in turn connected to a high-voltage network which is intended to transmit energy and has a nominal voltage of more than 52 kV.

A cloud infrastructure is, for example, a group of a plurality of computing centers each having a large number of powerful computers. The computers are equipped with data processor resources, for example "central processing units" (CPUs) and/or "graphics processing units" (GPUs).

Data storage resources, for example "solid state disks" (SSDs) or magnetic hard disks, are also provided.

A server computer arrangement which is locally located in the network control center of a network operator has, for example, comparable data storage and data processor resources as explained at the outset for the cloud infrastructure.

The basic concept of the invention is to at least partially transfer control center software, as part of a control arrangement, to a cloud software architecture, wherein the individual modules of the control center software, for example a network state estimation device or voltage reactive power control (volt var control—VVC), are hosted by means of so-called "micro-services" in the cloud.

Micro-services in the sense of the invention are software modules which represent individual independent processes involved in the data processing of a complex software application and communicate with one another by way of interfaces. The individual software modules may each implement a partial aspect of the complex software application and are substantially decoupled from the other software modules. A software module or micro-service in the sense of the invention comprises, for example, an executable program code in any desired programming language. An advantage is that this extremely granular architecture makes it possible to load security updates or adaptations of the respective software module in a comparatively simple manner since, on account of the interfaces, only a few interactions with other software modules need to be taken into account. This increases the operational reliability and saves running costs.

As a result of a micro-services-based software architecture, different implementation paradigms and programming languages such as "C" or Java can be easily combined inside the control center software since each micro-service interacts with other micro-services only via the interfaces. This makes it possible to gradually transfer ("lazy migration") individual software components of an existing control center system to a hybrid cloud software architecture, that is to say using both local computer capacities and centrally hosted computer capacities.

An interface has, for example, a communication device which can interchange data with another communication device using TCP/IP and in a manner encrypted using PKI. Wired connections via copper cable or optical fiber, power-line communication connections via a power line, radio connections according to the 2G, 3G, 4G, 5G or long-range radio standard, for example, can be used as the transmission medium.

Data communication in the sense of the invention is, for example, the transmission and reception of digital messages, that is to say bit sequences.

The described method is a computer-implemented method, that is to say it uses software modules or software applications, inter alia on the cloud infrastructure, but sometimes also locally on computers in the network control center.

For example, complex calculation methods which can be easily and quickly scaled to the required computing power within the cloud can be provided for the software modules in the first group. These may be, for example, software modules for estimating the present network state and/or for predicting a future network state using simulation methods.

The second group of software modules which are operated in situ in the control center of the network operator and are controlled there by control center engineers may comprise, for example, more time-critical functionalities such as the display of alarms, measurement data, switching states and network states in a geographical representation of the network area or a schematic representation of individual switchgear. This is an advantage since a cloud may result in higher data transmission latencies than is the case in a local server arrangement. This means that a more sluggish, that is to say slowed-down, response behavior of a user interface occurs, for example when operating the user interface by means of a cloud. This can be avoided to the greatest possible extent if the user interface, which requires a high performance for its graphical representation during changing or updating, indeed finds its database in the cloud, for example, but stores up-to-date data locally.

It is particularly preferred if measurement data relating to voltage and current intensity and phasor measurement data from different measurement points in the energy network and switching states are stored for long-term data storage in situ in data storage resources. This is an important requirement imposed on a control system for many network operators since the up-to-date measurement data and present switching states must not be lost under any circumstances. Only then can a control system react quickly in the event of faults and the cause of the faults can then be determined by analyzing the recorded information. In other words, there must be no loss of data. This is ensured, for example, by virtue of the local data storage resources being redundantly mirrored in the cloud. In addition, cloud technology also enables more cost-efficient long-term storage of the data in comparison with data storage in situ.

A further aspect is that a hybrid control arrangement makes it possible to connect field devices, measurement devices, switching devices, protective devices, etc. to the local installation. Those devices, owing to their design, do not have any possibility for direct communication with the functionality hosted in the cloud using TCP/IP. In addition, cloud providers, that is to say operators of a cloud infrastructure, generally charge fees for using the cloud, which depend, inter alia, on the number and scope of input/output operations. In other words, the more data interchange processes are carried out at the same time between the server computer arrangement and the cloud infrastructure, the more expensive it is for the provider of the network control system to use the cloud. If, for example, two control center engineers are working at two different workstations and both require an updated operator interface of the software, high costs arise for the duplicate request of the data required for this purpose from the cloud. However, if the data needed to update the operator interface are locally hosted in the server computer arrangement, fewer data possibly need to be requested from the cloud, which saves costs.

A public key infrastructure (PKI) in the sense of the invention is, for example, a system which can issue, distribute and check digital certificates. The certificates issued inside a PKI are used to protect data communication between the software modules or micro-services. For regulatory requirements with respect to data protection in some countries in particular, it is advantageous to use a hybrid control arrangement having distributed control center software, with the result that one part of the functionality is offered locally in the control center of the network operator and another part of the functionality is offered centrally in a cloud. In such a case, the data can be interchanged between the local installations and the cloud installations by way of PKI with end-to-end encryption on the application level. In comparison with VPN communication, this has the advantage that not all communication between the cloud and the network control center is encrypted using the same code, but rather any logical connection between two applications uses a separate encryption code.

In one development, PKI encryption can be used between all software modules. This makes it possible to encrypt even cloud-internal data interchange between micro-services (that is to say, for example, in the "local area network" (LAN) of the computing center) and therefore to further improve data security with respect to manipulations. This is an important advantage over previous systems which use, for example, data communication by way of a so-called "virtual private network" (VPN), since communication inside the cloud is not protected in this system.

The invention has many advantages over the "lift and shift" approach mentioned above. In the "lift and shift" approach, specific computer hardware, for example server computers or hard disks, is simply replaced with a so-called "virtual machine" which runs in a cloud computing center and uses special routers for protected data communication to the local control center via a so-called "wide area network" (WAN). Although no major adaptations therefore need to be made to existing software, on the one hand, the advantages of a cloud software architecture cannot be fully used either, on the other hand. In particular, complex manual configuration of the software must be carried out for scaling in order to make the actually "monolithic" control center software executable on a larger number of virtual machines and to then dimension them according to the requirements of a "worst case" scenario.

In one preferred embodiment of the method according to the invention, measurement data and/or switching states of measurement devices and/or equipment are received by way of the control arrangement. For example, the measurement data may be voltage values, current values or phasor measurement data. The measurement devices may be, for example, voltage measurement devices, current measurement devices or phasor measurement units (PMUs). Equipment in the sense of the invention may be, for example: protective devices, remote terminal units (RTUs), transformers with a tap changer, switchgear, network controllers, capacitor banks, producers of electrical energy and consumers of electrical energy.

In one preferred embodiment of the method according to the invention, control commands are created by means of the control arrangement and are transmitted to controllable equipment in the energy network. The controllable equipment is, for example, protective devices, transformers with a tap changer, switchgear, network controllers, capacitor banks, producers of electrical energy and consumers of electrical energy. The control commands may instruct, for example, the opening or closing of a switch or may comprise the switching-on or switching-off of a capacitor bank. In this manner, the energy network can be kept in a state ready for operation by means of the control arrangement, since voltage or frequency deviations are counteracted, equipment overloading is avoided and the network stability is ensured.

In a further preferred embodiment of the method according to the invention, at least one of the following software modules is used for the software modules: a data acquisition module, a module for interchanging data with other control centers, a monitoring and control module, an archiving module, a calculation module for analytical functions, a state estimation module for a present network state, a state estimation module for a future network state. The monitoring and control module may be, for example, the "supervisory control and data acquisition" (SCADA) functionality which is used to display measurement data and switching states from the energy network in the control center and to create control commands for controllable equipment such as switching devices or tap changers for transformers.

In a further preferred embodiment of the method according to the invention, software modules are selected from a database containing software modules by means of a configuration module. This is an advantage because control center software can be easily and quickly adapted to the requirements of a customer or network operator by a user in this manner. This is substantially less complicated than a customer-specific adaptation, as previously required in the case of complex control center software.

In a further preferred embodiment of the method according to the invention, the selected software modules are assigned to the first or second group by means of the configuration module. This makes it possible, for example, to very easily provide software modules for data collection and preprocessing locally in a control center of an operator ("on premise"). The server computers available there can be connected to field devices, switches, etc. using a wide variety of communication channels. It is possible to use, for example, powerline communication connections via a power line, radio connections according to the 2G, 3G, 4G, 5G or long-range radio standard or optical connections using optical waveguides. Communication connections can be automatically defined and parameterized, for example, by means of the configuration module.

In a further preferred embodiment of the method according to the invention, a visual representation of the software modules from the database is presented for selection by means of the configuration module. This is an advantage because it is possible to select, for example, a symbolic representation in which each software module is represented as an object, for instance a rectangle with a label. The user can then easily pull the desired modules to the desired position (local or central) with a mouse click and can link them to other software modules via an interface. This "what-you-see-is-what-you-get" (WYSIWYG) approach can be controlled very intuitively.

In a further preferred embodiment of the method according to the invention, data processor resources and data storage resources are provided at at least two different locations within the cloud infrastructure, with the result that, in the event of a fault in the operation of the data processor resources and data storage resources at one location, failure-free operation of the control arrangement is ensured at another location. This concept of incorporated redundancy is often referred to as "cloud availability zones" in the cloud context. For example, part of the cloud infrastructure may be between computing centers in two different towns, with the result that all software modules needed to operate the control arrangement can be processed in one computing center in an emergency if the other computing center is not ready for operation, for example as a result of a hacker attack, a flood, a fire, an earthquake or as a result of failure of the electrical energy supply or the data communication connections.

In a further preferred embodiment of the method according to the invention, a required computing power and/or a required data storage space for a future time is/are estimated by means of a computing load software module, and additional copies of software modules in the cloud infrastructure are activated on the basis of the estimation. This concept of incorporated redundancy is often referred to as "scaling out" in the cloud context. On account of the increasing connection of renewable energy producers (wind power, photovoltaics) on the medium-voltage and low-voltage levels for example, it is possible to predict an increased computing requirement for a state estimation or a VVC in the energy network within the next four weeks. Accordingly, it is possible to quickly switch on a copy or a further instance of a software module for parallel data processing. However, in principle, further instances of software modules which have already been configured can also be activated within seconds if required by the situation. This may be the case, for example, as a bad weather front approaches, if an increased occurrence of fault messages can be expected as a result of lightning strikes.

A further exemplary embodiment of scaling out is if regularly occurring tasks which require a high computing power and/or computing time are performed in the cloud, wherein additional data processor resources and/or data storage resources are booked by the cloud operator for the duration of the calculation. For example, calculations for a so-called "day ahead congestion forecast" must be carried out every day at 5:00 μm. In this context, it is useful to only book additional resources for the expected duration of the calculation every day from 5:00 pm on. This approach makes it possible to avoid keeping a computer infrastructure, which is designed for this peak computing load and is rarely fully used, available in a local control center. This makes it possible to achieve a cost savings.

In a further preferred embodiment of the method according to the invention, at least one additional software module for operating one of the following networks is provided for the control arrangement: a gas distribution network, a water distribution network, a wastewater system, a district heating network, a district cooling network. This is an advantage because sector coupling can be easily implemented, for example between an energy distribution network and a district heating network. It is therefore possible to achieve an overall optimization with regard to costs and/or $CO_2$ emissions, for example.

In a further preferred embodiment of the method according to the invention, the cloud infrastructure simultaneously operates a plurality of mutually separate user groups of software modules, wherein all data from a user group are stored such that they are inaccessible to software modules of all other user groups by means of encryption. This procedure is also referred to as "multi-tenancy", that is to say a plurality of network operators can be simultaneously served within a cloud solution. In this case, it is ensured that data such as present and historical measured values, present and historical switching states and network states, etc. are made available only to the authorized user and there is no mixing of the operating data from different network operators.

On the basis of a previous control arrangement for an energy network, it is a further object of the invention to specify a control arrangement for an energy network, which control arrangement is used to achieve comparatively even greater availability, a high degree of security with respect to manipulations and efficient use of data processing resources.

With the above and other objects in view there is also provided, in accordance with the invention, a control arrangement for an energy network, the control arrangement comprising:
 a cloud infrastructure having data processor resources and data storage resources;
 a first group of software modules that are configured for execution on said cloud infrastructure;
 a second group of software modules that are configured for local execution on a server computer arrangement; and
 interfaces configured to connect said first group and said second group for data communication, said interfaces using a public key infrastructure for encryption.

The various advantages of the invention, as explained above with reference to the method, apply analogously in the context of the arrangement.

Other features which are considered as characteristic for the invention are set forth in the appended claims.

Although the invention is illustrated and described herein as embodied in a method for operating a control arrangement for an energy network, and a control arrangement, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of a specific embodiment when read in connection with the accompanying drawing.

BRIEF DESCRIPTION OF THE FIGURE

The sole FIGURE of the drawing illustrates an electrical energy network at a low-voltage level which is connected to a medium-voltage level by way of a transformer.

DETAILED DESCRIPTION OF THE INVENTION

Referring now to the FIGURE of the drawing in detail, there is shown an electrical energy network 2 having a low-voltage level 10 which is connected to a medium-voltage level 43 via a transformer 40.

The low-voltage level 10 has a building 14 forming a so-called "prosumer" (i.e., a unit which is active both as an energy producer and as an energy consumer), a photovoltaic installation 13, a switching device 11 and a voltage measurement device 12, which are connected to a first communication device 7 of a local control center 3 of the network operator by way of data communication connections 9. These data communication connections 9 to the local control center preferably have a redundant design.

A production installation 15 and a wind power installation 16 are directly connected to the cloud infrastructure by way of data communication connections 9. On the low-voltage level 10, in particular, it is very useful to connect measurement points and controllable units directly to the cloud infrastructure. This can be carried out, for example, using TCP/IP and/or one of the radio technologies explained at the outset. Since the low-voltage level is also intended to be equipped with many measurement devices and controllable producers and consumers in future, great expenditure for connection to the network control center can be avoided by the direct connection. This is because over-dimensioning for a complex communication infrastructure in the local server computer arrangement 6 is no longer required since the low-voltage technology devices can be directly incorporated, for example using TCP/IP. In the illustrated example, connection is effected in the cloud infrastructure via communication devices 40. The data communication connections 9 to the communication devices 40 are preferably such that the data communication connections 9 from the energy network 2 are each connected to both locations 25, 26, i.e., to both computing centers (not illustrated). This has the advantage that, if a computing center at one location fails, the computing center at the other location can seamlessly take over without a loss of data.

However, an indirect connection to the cloud infrastructure can also be established by virtue of measurement data and operating states of devices in the low-voltage network first of all being transmitted to a so-called "data management system", that is to say a device, for example a cloud-based device, for evaluating smart meter data, or to a "remote terminal unit" functionality which is virtually represented in a cloud. From there, the data may be forwarded to the cloud infrastructure of the control arrangement.

The medium-voltage level 43 has a switching device 41 and a protective device 42 which are likewise connected to the first communication device 7 of the local control center 3 of the network operator by way of data communication connections 9. In this manner, measurement data and operating states from the energy network can be transmitted to the local control center 3. Control commands can be transmitted from the control center 3 to controllable consumers 14, 15, producers 13, 16 or equipment 11, 41, 42.

The local control center 3 has a server computer arrangement 6 which has the first communication device 7 for data communication with devices in the energy network. A data storage resource 17 has a plurality of hard disks which are redundantly designed as a so-called "RAID" (redundant array of independent disks). The server computer arrangement 6 is connected to a desktop computer 4 having display means, for instance a display panel or a monitor 5. A control center engineer can control the control arrangement 1 with the control center software on the desktop computer 4.

The server computer arrangement 6 has a data processor resource 18, on which a second group 19, 20, 21 of software modules is locally executed. For this purpose, the data processor resource 18 has, for example, a plurality of CPUs with a main memory (not illustrated). The software modules 19, 20, 21 are two data acquisition modules 19, 20 and a configuration module 21. The software modules 19, 20, 21 each have an interface 22, which is likewise designed as software, and use encrypted data communication 23 by means of a public key infrastructure.

PKI-encrypted data communication is enabled between the local server computer arrangement 6 and a cloud infrastructure 24 by means of a second communication device 8.

The cloud infrastructure 24 has two computing centers at two different locations 25, 26 which are each equipped with a second communication device 8 for PKI-encrypted data communication 23 with one another and with the server computer arrangement 6 and likewise each have a data storage resource 17. Each computing center has a data processor resource 18.

The data processor resource 18 at the first location 25 is assigned software modules 26, 27, 28 which are equipped for PKI-encrypted data communication with other software modules by way of interfaces 22. These are a monitoring and control module 26 and two calculation modules for analytical functions 27, 28. The data processor resource 18 at the second location 26 is assigned software modules 29, 30, 31 which are equipped for PKI-encrypted data communication with other software modules by way of interfaces 22. These are two state estimation modules for a present network state 29, 30 and a state estimation module for a future network state 31.

Providing a hybrid control arrangement which is designed partially locally and partially centrally in the cloud achieves a high degree of flexibility with respect to the scalability and changeability of individual functionalities (upgrades, security patches), on the one hand, and achieves a high degree of data security, on the other hand. The availability is increased further by having two computing centers available because, even in the event of a failure at one location, continued operation of the required software modules is ensured at the other location.

The invention claimed is:

1. A method of operating a control arrangement for an energy network, the method comprising:
    providing a cloud infrastructure having data processor resources and data storage resources;
    providing a first group of software modules for execution on the cloud infrastructure;
    providing a second group of software modules for local execution on a server computer arrangement; and
    connecting the first group of software modules and the second group of software modules for data communication via interfaces, and using a public key infrastructure for encryption by the interfaces.

2. The method according to claim 1, which comprises selecting the software modules by a configuration module from a database containing software modules.

3. The method according to claim 2, which comprises assigning the selected software modules to the first group or to the second group by the configuration module.

4. The method according to claim 2, which comprises presenting a visual representation of the software modules from the database for selection by the configuration module.

5. The method according to claim 1, which comprises using as a software module at least one software module selected from the group consisting of the following software modules:
    a data acquisition module, a module for interchanging data with other control centers, a monitoring and control module, an archiving module, a calculation module for analytical functions, a state estimation module for a present network state, and a state estimation module for a future network state.

6. The method according to claim 1, which comprises: providing the data processor resources and the data storage resources at two or more different locations within the cloud infrastructure, to thereby ensure a failure-free operation of the control arrangement at another location if a fault occurs in an operation of the data processor resources and/or data storage resources at one location.

7. The method according to claim 1, which comprises:
    estimating at least one of a required computing power or a required data storage space for a future time by a computing load software module; and
    based on an estimation by the software module, activating additional copies of software modules in the cloud infrastructure.

8. The method according to claim 1, which comprises providing for the control arrangement at least one additional software module for operating one of the following networks: a gas distribution network, a water distribution network, a wastewater system, a district heating network, or a district cooling network.

9. The method according to claim 1, wherein the cloud infrastructure simultaneously operates a plurality of mutually separate user groups of software modules, wherein all data from a user group are stored to be inaccessible to software modules of all other user groups by way of encryption.

10. A control arrangement for an energy network, the control arrangement comprising:
    a cloud infrastructure having data processor resources and data storage resources;

a first group of software modules that are configured for execution on said cloud infrastructure;

a second group of software modules that are configured for local execution on a server computer arrangement; and interfaces configured to connect said first group and said second group for data communication, said interfaces using a public key infrastructure for encryption.

11. The control arrangement according to claim 10, wherein said software modules include at least one software module selected from the group consisting of a data acquisition module, a monitoring and control module, a calculation module for analytical functions, a state estimation module for a present network state, and a state estimation module for a future network state.

12. The control arrangement according to claim 10, wherein said cloud infrastructure is configured to provide data processor resources and data storage resources for the control arrangement at two or more different locations, ensuring that, in an event of a fault in an operation of the data processor resources and/or data storage resources at one location, failure-free operation of the control arrangement is ensured at another location.

13. The control arrangement according to claim 10, further comprising a computing load software module configured to estimate a required computing power and/or a required data storage space for a future time, and wherein said cloud infrastructure is configured to activate additional copies of software modules on a basis of the estimation effected by said computing load software module.

14. The control arrangement according to claim 10, further comprising at least one additional software module for operating at least one network selected from the group consisting of a gas distribution network, a water distribution network, a wastewater system, a district heating network, and a district cooling network.

15. The control arrangement according to claim 10, wherein said cloud infrastructure is configured to simultaneously operate a plurality of mutually separate user groups of software modules, and wherein all data from a user group are stored to be inaccessible to software modules of all other user groups by way of encryption.

* * * * *